(12) United States Patent
Widmaier et al.

(10) Patent No.: US 9,678,235 B2
(45) Date of Patent: Jun. 13, 2017

(54) VARIABLE DEPTH MULTICOMPONENT SENSOR STREAMER

(71) Applicant: PGS Geophysical AS, Oslo (NO)

(72) Inventors: Martin Widmaier, Oslo (NO); Anthony J. Day, Drammen (NO); Neil H. R. Turnbull, Edinburgh (GB)

(73) Assignee: PGS Geophysical AS, Oslo (NO)

( * ) Notice: Subject to any disclaimer, the term of this patent is extended or adjusted under 35 U.S.C. 154(b) by 400 days.

(21) Appl. No.: 14/107,823

(22) Filed: Dec. 16, 2013

(65) Prior Publication Data
US 2015/0003195 A1 Jan. 1, 2015

Related U.S. Application Data

(60) Provisional application No. 61/841,639, filed on Jul. 1, 2013.

(51) Int. Cl.
*G01V 1/38* (2006.01)

(52) U.S. Cl.
CPC .......... *G01V 1/3817* (2013.01); *G01V 1/3808* (2013.01); *G01V 2210/32* (2013.01); *G01V 2210/34* (2013.01); *G01V 2210/56* (2013.01)

(58) Field of Classification Search
CPC ................ G01V 2210/56; G01V 1/3808
See application file for complete search history.

(56) References Cited

U.S. PATENT DOCUMENTS 3,530,952 A * 9/1970 Epstein ................. B63B 22/18
116/137 A
4,353,121 A 10/1982 Ray et al.
(Continued)

FOREIGN PATENT DOCUMENTS

| EP | 2352040 A2 | 3/2011 |
|---|---|---|
| EP | 2360496 | 8/2011 |
| WO | 2013/116195 | 8/2013 |

OTHER PUBLICATIONS

Eurasian Patent Search Report mailed on Mar. 3, 2015, during the prosecution of Eurasian patent application No. 201491041, and English translation thereof, 4 pages.
(Continued)

*Primary Examiner* — Luke Ratcliffe
*Assistant Examiner* — Amie M N'Dure

(57) ABSTRACT

Variable depth multicomponent sensor streamer. At least some of example embodiments are methods including designing a depth profile for first portion of a sensor streamer by determining a first target depth for a first hydrophone-geophone pair, the first hydrophone-geophone pair at a first offset along the sensor streamer, the determining based on a first projected geophone noise floor at the first offset and a first expected spectral notch of a hydrophone of the first hydrophone-geophone pair; and determining a second target depth for a second hydrophone-geophone pair, the second hydrophone-geophone pair at a second offset along the sensor streamer, the second offset greater than the first offset, and determining the second target depth based on a second projected geophone noise floor in the sensor streamer at the second offset and a second expected spectral notch of a hydrophone of the second hydrophone-geophone pair; wherein the second target depth is greater than the first target depth.

25 Claims, 8 Drawing Sheets

(56) References Cited

U.S. PATENT DOCUMENTS

| | | | |
|---|---|---|---|
| 5,247,937 A * | 9/1993 | Ophir | A61B 5/0048 600/449 |
| H001533 H * | 6/1996 | Bowers | A01K 15/02 119/174 |
| 6,702,745 B1 * | 3/2004 | Smythe | G01S 15/8993 600/443 |
| 7,123,543 B2 | 10/2006 | Vaage et al. | |
| 7,359,283 B2 | 4/2008 | Vaage et al. | |
| 7,505,361 B2 | 3/2009 | Sollner | |
| 7,616,523 B1 * | 11/2009 | Tabti | G01V 1/3808 367/21 |
| 7,684,281 B2 | 3/2010 | Vaage et al. | |
| 7,800,976 B2 | 9/2010 | Stokkeland et al. | |
| 7,957,221 B2 * | 6/2011 | Kluver | G01V 1/36 367/21 |
| 8,400,871 B2 | 3/2013 | Meldahl et al. | |
| 8,451,682 B2 | 5/2013 | Soubaras | |
| 8,456,949 B2 | 6/2013 | Cambois | |
| 8,456,951 B2 | 6/2013 | Soubaras | |
| 8,477,561 B2 | 7/2013 | Singh et al. | |
| 8,526,268 B2 | 9/2013 | van den Berg et al. | |
| 8,531,912 B2 | 9/2013 | Soubaras | |
| 8,582,394 B2 | 11/2013 | Sudow et al. | |
| 9,383,470 B2 | 7/2016 | Soubaras | |
| 9,395,457 B2 | 7/2016 | Poole | |
| 9,442,208 B2 | 9/2016 | Poole | |
| 9,494,702 B2 | 11/2016 | Poole | |
| 9,535,181 B2 | 1/2017 | Poole | |
| 2004/0042341 A1 | 3/2004 | Tenghamn | |
| 2004/0218470 A1 | 11/2004 | Vaage | |
| 2006/0227659 A1 * | 10/2006 | Grion | G01V 1/3808 367/24 |
| 2007/0025182 A1 * | 2/2007 | Robertsson | G01V 1/38 367/18 |
| 2007/0127312 A1 * | 6/2007 | Storteig | G01C 13/006 367/15 |
| 2009/0262601 A1 | 10/2009 | Hillesund et al. | |
| 2010/0124148 A1 * | 5/2010 | Kluver | G01V 1/36 367/24 |
| 2010/0124149 A1 * | 5/2010 | Barr, Jr. | G01V 1/3808 367/24 |
| 2010/0128561 A1 | 5/2010 | Meldahl et al. | |
| 2010/0135112 A1 | 6/2010 | Robertsson | |
| 2010/0226204 A1 * | 9/2010 | Gagliardi | G01V 1/38 367/16 |
| 2011/0103179 A1 | 5/2011 | Vageskar et al. | |
| 2011/0158045 A1 | 6/2011 | Karlsen et al. | |
| 2011/0176384 A1 | 7/2011 | Soubaras | |
| 2011/0182138 A1 | 7/2011 | Sudow et al. | |
| 2011/0203509 A1 * | 8/2011 | Austad | G01V 1/38 114/244 |
| 2011/0305109 A1 | 12/2011 | Soubaras | |
| 2011/0317514 A1 | 12/2011 | Sudow et al. | |
| 2012/0092956 A1 | 4/2012 | Soubaras | |
| 2012/0213033 A1 | 8/2012 | Soubaras | |
| 2012/0218858 A1 | 8/2012 | Soubaras | |
| 2012/0218859 A1 | 8/2012 | Soubaras | |
| 2012/0224453 A1 * | 9/2012 | Wu | G01V 1/3808 367/16 |
| 2012/0224454 A1 | 9/2012 | Soubaras | |
| 2013/0025362 A1 | 1/2013 | Sudow et al. | |
| 2013/0028049 A1 | 1/2013 | Pan | |
| 2013/0064038 A1 | 3/2013 | Maples et al. | |
| 2013/0163376 A1 | 6/2013 | Poole | |
| 2013/0163379 A1 | 6/2013 | Poole | |
| 2013/0176819 A1 | 7/2013 | Poole | |
| 2013/0208565 A1 | 8/2013 | Orji et al. | |
| 2013/0242953 A1 | 9/2013 | Soubaras | |
| 2013/0272090 A1 | 10/2013 | Peppe et al. | |
| 2013/0279290 A1 | 10/2013 | Poole | |
| 2013/0322207 A1 | 12/2013 | Soubaras | |
| 2014/0078860 A1 | 3/2014 | Poole et al. | |
| 2014/0200813 A1 | 7/2014 | Montel et al. | |
| 2014/0241118 A1 | 8/2014 | Landais et al. | |
| 2014/0288839 A1 | 9/2014 | Soubaras | |
| 2014/0288843 A1 | 9/2014 | De Meersman et al. | |
| 2014/0313854 A1 | 10/2014 | Soubaras | |
| 2014/0328140 A1 | 11/2014 | Khalil et al. | |
| 2014/0365131 A1 | 12/2014 | Elboth | |
| 2014/0365135 A1 | 12/2014 | Poole | |
| 2016/0131785 A1 | 5/2016 | Tonchia | |
| 2016/0187513 A1 | 6/2016 | Poole et al. | |
| 2016/0327670 A1 | 11/2016 | Wang et al. | |

OTHER PUBLICATIONS

Response to Office Action, U.S. Appl. No. 13/120,338, Response dated Jun. 14, 2013.

Carlson, David et al., Increased Resolution and Penetration from a Towed Dual-Sensor Streamer, Marine Seismic, first break vol. 25, Dec. 2007, pp. 71-77.

Soubaras, Robert, Broadband Technology, EAGE Education B.V., Education Days Stavanger, Nov. 28, 2013, pp. 1-116, The Netherlands.

Moldoveanu, N. et al., Broadband Seismic Methods for Towed-Streamer Acquisition, 74th EAGE Conference & Exhibition incorporating SPE EUROPEC 2012, Copenhagen, Denmark, Jun. 4-7, 2012.

Sentinel MS, 3-C Multi-Sensor Broadband Streamer, Carquefou, France, May 2013.

Sonneland, Lars, et al., 2-D Deghosting Using Vertical Receiver Arrays, SEG, Seismic 11, 1986.

Soubaras, Robert, Deghosting by Joint Deconvolution of a Migration and a Mirror Migration, SEG, 2010 Annual meeting, pp. 3406-3410.

GeoStreamer: Deeper Tow, PGS, Technology Day Rio, Nov. 11, 2013.

Vassallo, M., et al. Broadband and Beyond with Marine Towed Streamers, The Leading Edge, pp. 1356-1365, Nov. 2013.

PGS Geophysical AS "Advances in Towed Marine Streamer Technology", Techlink, vol. 8, No. 12, Dec. 1, 2008, 4 pages.

Robert Soubaras et al., "Marine Seismic Variable-depth Streamer—a broadband marine solution", First Break, vol. 28, No. 12, Dec. 1, 2010, pp. 89-96.

European Search Report, Application No. 14175228.7, mailed Sep. 9, 2015.

Office Action for Mexican Patent Application No. MX/a/2014/008077, mailed on Sep. 22, 2016.

Office Action for U.S. Appl. No. 15/055,223, mailed on Aug. 24, 2016.

Feb. 7, 2017, Office Action issued by the US Patent and Trademark Office in related divisional U.S. Appl. No. 15/055,223.

* cited by examiner

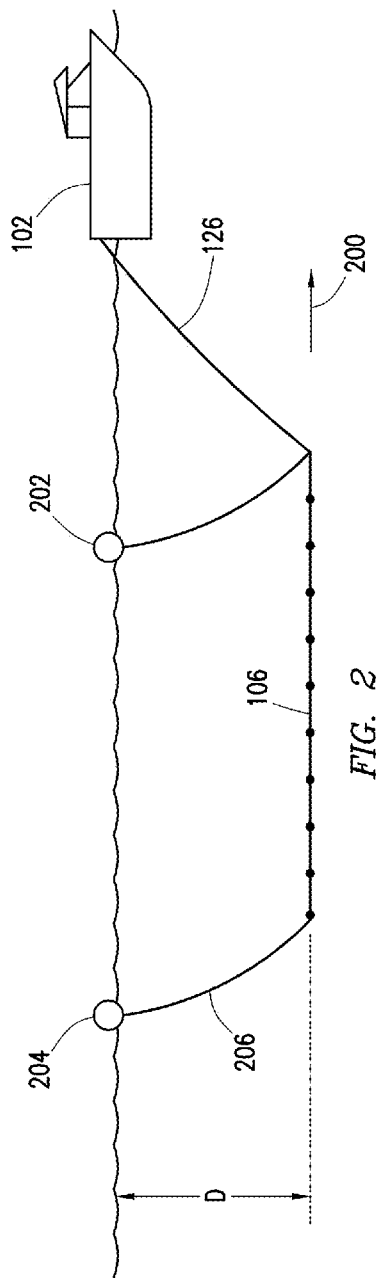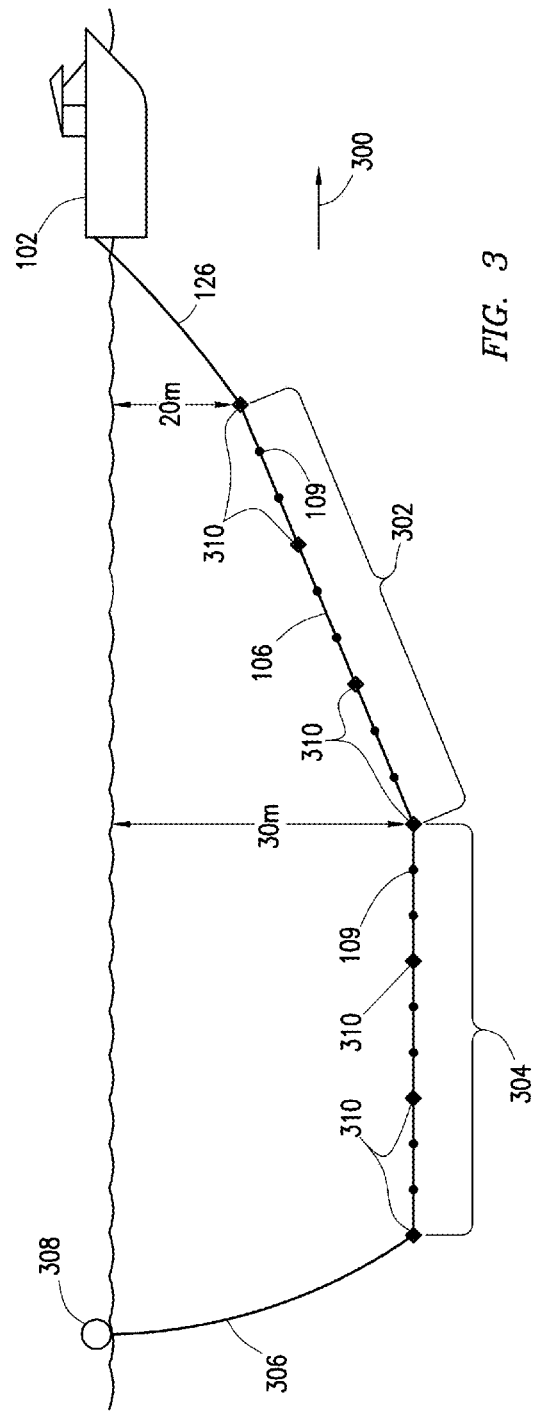

VARIABLE DEPTH MULTICOMPONENT SENSOR STREAMER

CROSS-REFERENCE TO RELATED APPLICATIONS

This application claims the benefit of provisional application Ser. No. 61/841,639 filed Jul. 1, 2013 and titled "Variable Depth Multicomponent Sensor Streamer." The provisional application is incorporated by reference herein as if reproduced in full below.

BACKGROUND

Marine survey systems are used to acquire seismic data regarding Earth formations below a body of water such as a lake or ocean. The marine survey systems comprise a complex array of buoys, lines, and paravane systems in order to properly orient streamers towed behind the survey vessel. Noise in the signals recorded by the sensors may adversely affect the ability to analyze the seismic data, and thus any advance which reduces noise in the signals recorded by the sensors may provide a competitive advantage.

BRIEF DESCRIPTION OF THE DRAWINGS

For a detailed description of exemplary embodiments, reference will now be made to the accompanying drawings in which:

FIG. 2 shows a side elevation view of marine survey system;

FIG. 3 shows a side elevation view of marine survey in accordance with at least some embodiments;

NOTATION AND NOMENCLATURE

Figure 1:
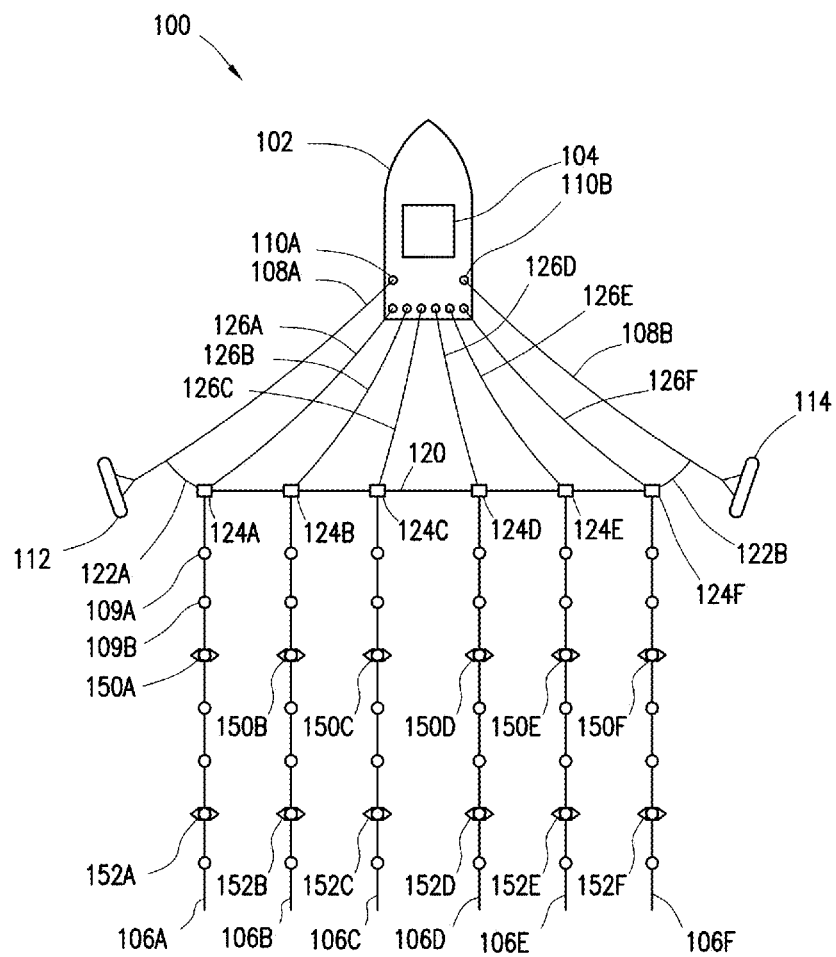
FIG. 1 shows an overhead view of a marine survey in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Hydrophone-geophone pair" shall mean a co-located pair of sensors, one sensor being a hydrophone and one sensor being a geophone.

"Co-located" shall mean within 30 centimeters.

"Geophone" shall mean a class of sensors whose output signals are responsive to movement, displacement, velocity, and/or acceleration of the geophone. Thus, term "geophone" includes accelerometers, including accelerometers embodied as microelectromechanical systems (MEMS) devices.

"Hydrophone" shall mean a class of sensors whose output signals are responsive to pressure changes proximate to the hydrophone.

"Noise floor" shall mean a frequency below which a signal of interest from a geophone falls below a predetermined signal-to-noise threshold.

"Spectral notch" shall mean a frequency or frequencies at which destructive interference from the surface ghost reduces the amplitude of a received signal. "Expected spectral notch" shall mean a frequency or frequencies at which destructive interference is expected during operation.

"Surface ghost" shall mean a downward traveling acoustic signal in a body of water, the surface ghost created by reflection at the surface of an upward traveling acoustic signal.

"Offset" shall mean a location of a component of a sensor streamer along the sensor streamer.

"About" shall mean within plus or minus five percent (+/−5%) of a recited value

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Various embodiments are directed to a sensor streamer towing technique that reduces noise detected by hydrophones and geophones at particular depths. More particularly, various embodiments are directed to a towing technique where the depth of tow of any particular portion of the sensor stream is based at least in part on the tension carried by the portion of the sensor streamer, with deeper towing for portions of the sensor streamer carrying less tension. Other various embodiments are directed to methods for designing depth profiles based at least in part on the expected tension carried by the portion of the sensor streamer, or noise in the streamer. Additional embodiments are directed to methods for utilizing a depth profile to selectively augment or replace hydrophone data with geophone data to compensate for surface ghost signals (e.g., to selectively replace data corresponding to spectral notch frequencies or expected spectral notch frequencies). The specification first turns to an illustrative marine survey system.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The sensor streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches, for example, may enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to, inter alia, provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The sensor streamers 106 are each coupled, at the ends nearest the vessel 102 (i.e., the "proximal" or "forward" ends) to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the sensor streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

The length of each sensor streamer 106 may be fixed for a particular marine survey, but the length of the sensor streamer may range from as short as a few thousand meters, to lengths of 10,000 meters or more in other cases. In order to control depth of the sensor streamers 106, and further to control lateral spacing between the streamers over the entire length of the streamers, each sensor streamer may be associated with a plurality of streamer positioning devices periodically spaced along the sensor streamer. For example, the sensor streamers 106A-F may be associated with streamer positioning devices 150A-F, respectively, shown coupled on proximal end of the sensor streamers. In many cases, the streamer positioning devices 150A-F may provide only depth control, as the lateral spacing of the sensor streamers near the proximal ends may be adequately controlled by the spreader cable 120. Further, the sensor streamers 106A-F may be associated with streamer positioning devices 152A-F, respectively, shown coupled further from the proximal ends, and in some cases near the distal ends (i.e., furthest from the vessel; aka "aft ward" or "tail" ends) of the sensor streamers 106A-F. The streamer positioning devices 152A-F may provide not only depth control, but also lateral positional control. While FIG. 1 shows only two streamer positioning devices 150 and 152 associated with each sensor streamer 106, in practice each streamer may have many streamer positioning devices periodically spaced along the entire length the sensor streamer (e.g., every 20-30 meters).

In at least some embodiments discussed herein, each sensor 109 comprises hydrophone-geophone pairs. That is, each sensor 109 may comprise a hydrophone and co-located geophone, referred to as a hydrophone-geophone pair. A hydrophone is a device which creates an output signal (e.g., electrical, optical) proportional to the pressure sensed by the hydrophone, and more particularly to changes in pressure proximate the hydrophone as acoustic signals traveling in the water pass the hydrophone. A geophone is a device which senses particle motion, and more particularly a geophone produces an output signal (e.g., electrical, optical) responsive to minute movements, velocity, and/or acceleration of the geophone as acoustic signals travelling in the water pass the geophone. In most cases the hydrophone and geophone of a hydrophone-geophone pair are within a few centimeters of each other (e.g., 10 centimeters), but closer spacing and longer spacing is also contemplated. In some cases, the geophone is responsive only to movements/ acceleration in the vertical direction (e.g., a z-component geophone); however, in other cases the geophone may be sensitive to movements/acceleration in all three orthogonal directions.

FIG. 2 shows a side elevation view of a sensor streamer 106 to further describe depth control. In particular, FIG. 2 shows a streamer 106 being towed in a direction indicated by arrow 200 by tow vessel 102. In some embodiments, the forward portion of the sensor streamer may be associated with a lead buoy 202, where lead buoy 202 may help maintain the depth of the sensor streamer 106 and/or associated portion of the spreader line; however, in other cases the lead buoy 202 may be omitted, or other buoys (e.g., buoys associated with the spreader line 120 (not shown in FIG. 2)) may perform similar functions. FIG. 2 also illustrates a tail buoy 204. Tail buoy 204 may couple to the sensor streamer 106 by any suitable mechanism, such as line 206, sometimes referred as a "dead section". Tail buoy 204 may at least partially support the sensor streamer 106 at the selected depth D below the surface, and thus may help maintain the depth of the streamer 106; however, in other cases the tail buoy 204 may be omitted. Between the proximal end of the sensor streamer 106 and the distal end of the sensor streamer 106, the streamer positioning devices (not specifically shown) may help with localized depth control of the sensor streamer.

FIG. 2 further shows the operational philosophy of the related art in regards to tow depth of each sensor streamer. In particular, in the related art the entire sensor streamer 106 may be towed at or near the selected depth D. Stated otherwise, in the related art the setpoint or target depth for sensor streamer 106 during a marine survey is essentially uniform across the entire sensor streamer. Moreover, the tow depth for each sensor streamer 106 in the marine survey system 100 (FIG. 1) may be at the selected depth D. While localized depth excursions are possible based on water currents, in most cases the streamer positioning devices control depth to within +−0.5 meters of the setpoint or target depth. In related art marine surveys, the setpoint or target depth for each sensor streamer may be a single depth in the range of about 20 to about 25 meters. Moreover, in related art marine surveys with multiple streamers (making up a streamer spread or sensor array), the setpoint or target depth for the entire streamer spread may be a single depth.

The specification now turns to operational characteristics of hydrophones or arrays comprising hydrophones and geophones or arrays comprising geophones, and how the operational characteristics can be exploited to reduce noise in recorded data. Consider, as an example, sensor streamers 106 where multiple sensors 109 are hydrophone-geophone pairs (others of the sensors may, in some embodiments, comprise different types of sensors, or multiple different types of sensors). Hydrophones experience a spectral (i.e., frequency) notch as a function depth, where readings taken within the spectral notch may not be of sufficient quality for later information extraction. The frequency location of the spectral notch may be a function of depth, and more particularly the frequency location of the spectral notch typically moves to lower frequencies with increasing depth of the hydrophone.

Geophones too are susceptible to noise, where the noise component associated with a geophone may be related to tension in the sensor streamer at the location of the geophone. That is, geophones at locations along sensor streamer where tension is higher (e.g., at the proximal ends of the sensor streamers) may have higher noise components than geophones at locations where tension is lower (e.g., distal ends of the sensor streamers). Moreover, geophones may be subject to noise based on the propagation velocity of transverse mechanical noise along the sensor streamer. Propagation velocity of transverse mechanical noise may be a function of tension in the sensor streamer, such that locations along sensor streamer where tension is higher (e.g., at the proximal ends of the sensor streamers) have higher propagation velocity of transverse mechanical noise than locations where tension is lower (e.g., distal ends of the sensor streamers). Consequently, as would be understood by one of ordinary skill in the art with the benefit of this disclosure, the geophone noise floor may be a function of offset.

In some embodiments, other operational characteristics of hydrophones and/or geophones may additionally be exploited to reduce noise in recorded data. As one example, hydrophones may be susceptible to certain mechanical noise and/or geophones may be susceptible to certain acoustic noise, and these characteristics may additionally be exploited.

In accordance with example embodiments, tow depth may selectively increase along the sensor streamer. The tow depth for each portion of the sensor streamer is selected such that, at the depth related to the spectral notch for the hydrophone, the co-located geophone can obtain sufficient data such that hydrophone data lost in the spectral notch may be replaced with corresponding data from the geophone. Stated otherwise, various embodiments are directed to systems and related methods where the tow depth of a sensor streamer varies as a function of tension in the sensor streamer. Other embodiments are directed to systems and related methods where the tow depth of a sensor streamer varies as a function of offset or distance from the proximal end of the sensor streamer. Yet still other embodiments are directed to systems and methods where the tow depth of a sensor streamer varies as a function of the noise floor (or projected noise floor) of geophones in the sensor streamer. Further embodiments are directed to designing sensor streamer depth profiles based on offset, geophone noise floor, and/or tension in the sensor streamer.

FIG. 3 shows a side elevation view of a sensor streamer 106 utilizing depth control in accordance with example embodiments. In particular, FIG. 3 shows a sensor streamer 106 being towed in a direction indicated by arrow 300 by tow vessel 102, and sensor streamer comprises a first section 302 and second section 304. The sensor streamer 106 comprises a plurality of sensors 109, and likewise a plurality of streamer positioning devices 310 (which may have the same characteristics and functionality as streamer positioning devices 150 and 152 of FIG. 1). The sensors 109 may comprise hydrophone-geophone pairs as discussed above.

In accordance with various embodiments, the localized depth of the sensor streamer is based on the offset along the sensor streamer (i.e., distance from the proximal end). In particular, the depth of the first section 302 of the sensor streamer increases linearly from a proximal, most shallow point (and the point of highest tension on the streamer) to a distal, most deep point. In some embodiments, section 302 may be about 3,000 meters in length, and section 304 may be about 4,000 meters in length, but different lengths for each may be used in various embodiments. In the example system shown, the most shallow point may be about 20 meters, and the depth may change linearly in this example to deepest tow depth of about 30 meters. Having about 20 meters as the most shallow tow depth and about 30 meters as deepest tow depth with a linear depth change is merely illustrative, and other profiles are possible (e.g., 7 meters at the most shallow point, and 40 meters at the deepest point). The balancing of factors regarding noise from the hydrophone and geophones may result in different tow depths in different situations (e.g., different tension (arising from different towing speed or streamer configuration), different sources and degrees of tow noise excited by turbulence (e.g., devices attached to the streamer, or infestation by barnacles or algae), and/or different environmental factors (e.g., ice flows, swell or cross-current)). In some embodiments a chosen streamer depth profile may be a function determined by the noise and tension arising from the equipment configuration and expected environment. In other embodiments, the depth profile may additionally be adjusted, or adjustable, during the course of towing and data acquisition in response to changes in noise, tension or other factors, or in response to data recorded or measured by the streamer system. Nevertheless, at least a portion of the sensor streamer having higher tension has a controlled or setpoint depth shallower than other portions of the sensor streamer having less tension.

In the example system, the localized depth along the first section 302 may be controlled in part by having differing setpoint depths supplied to the streamer positioning devices 310 within the first section 302. For example, streamer positioning devices 310 may be capable of maintaining a programmed depth by modulating wings attached to the body of each streamer positioning device, and which may also control the lateral position of the sensor streamer. While localized depth excursions are possible based on water currents, the streamer positioning devices 310 may control depth to within +−0.5 meters of a setpoint or target depth of each streamer positioning device.

In the example system, the setpoint or controlled depth of second section 304 is constant and deeper than most or all of section 302. The depth profile of the second section 304 may be controlled by supplying identical setpoint depths to the streamer positioning devices 310 within the second section 302, possibly in combination with other devices and methods (such as tail buoy 308).

The example system of FIG. 3 is merely illustrative, and various numbers of streamer positioning devices 310, including tens of devices, or even hundreds of devices may be appropriate depending on specific applications. In some embodiments, the positioning devices 310 may be programmed prior to deployment. In other embodiments, the streamer positioning devices may be programmable while deployed. The plurality of streamer positioning devices work in conjunction to maintain the depth profile of the sensor streamer along its length.

Figure 4:
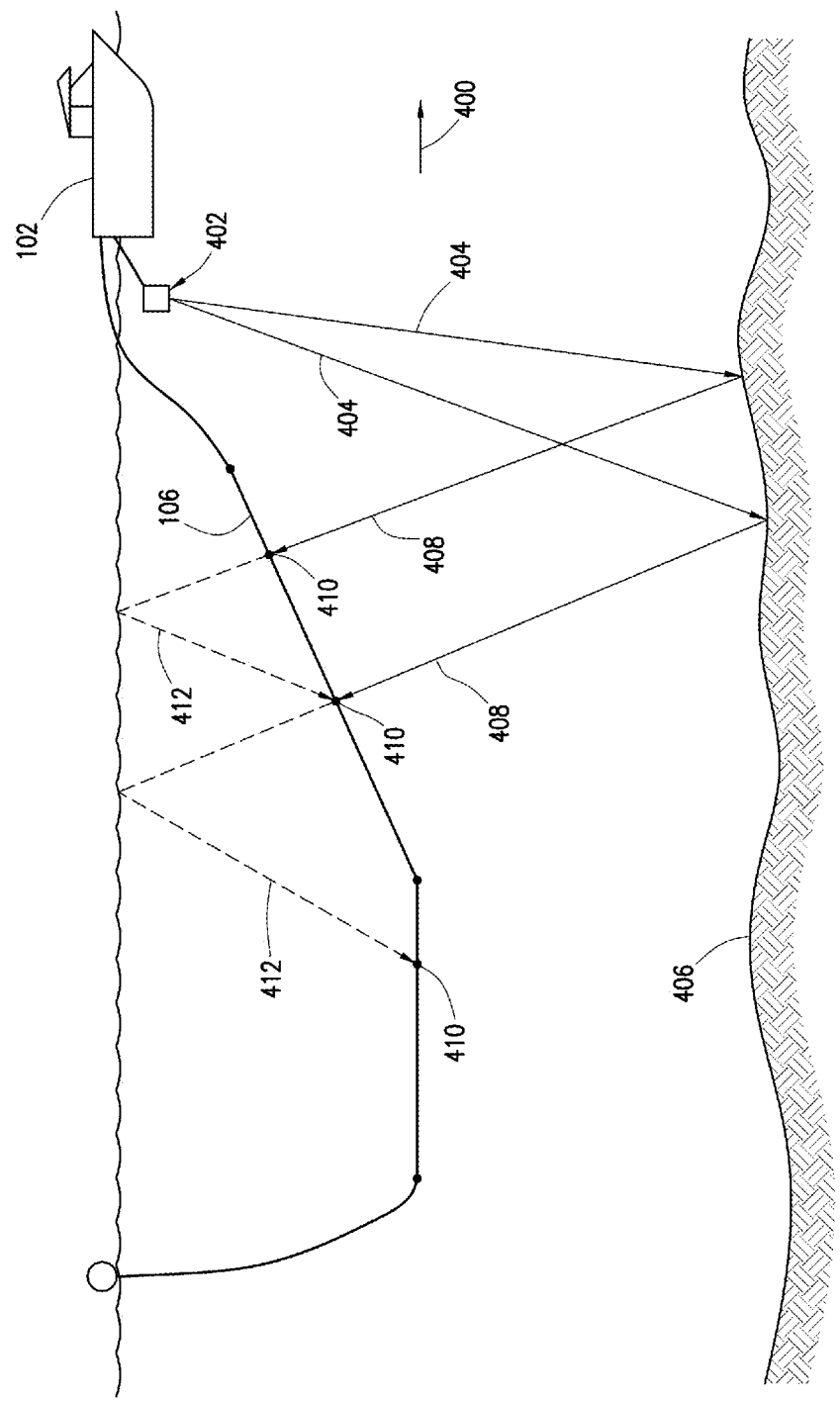
FIG. 4 shows a side elevation view of a marine survey in accordance with at least some embodiments.

In order to further describe how the example depth profile of FIG. 3 is designed and/or selected, the specification next turns FIG. 4. FIG. 4 shows a side elevation view of an embodiment of a sensor streamer 106 in an operational configuration similar to that depicted in FIG. 3 in order to demonstrate the surface ghost phenomenon responsible for spectral notches in hydrophone recordings. Tow vessel 102 is shown towing a sensor streamer 106 in a direction indicated by arrow 400. In some embodiments the tow vessel 102 tows a seismic source 402 (e.g., air guns or marine vibrators), which emits seismic source waves in a downward direction toward the seafloor 406. The seismic source may create waves defining propagating wave fronts, but so as not to unduly complicate the figure only the direction of travel of the wave fronts is shown by lines 404 (but still referred to as seismic waves 404). Seismic waves 404 may be reflected off the seafloor (and/or subsurface structures below the seafloor) in an upward direction as incident seismic waves 408 which intersect the sensor streamer at various hydrophone-geophone pair locations 410 creating signals in the various hydrophones and geophones of the sensor streamer. These incident seismic waves then continue upward past the sensor streamer and may be reflected downward off the surface of the water as "surface ghost" waves 412. These "surface ghost" waves intersect the streamer again at various hydrophone-geophone pair locations 410 causing destructive interference with upward traveling incident seismic waves at the hydrophones, resulting in spectral notches. For simplicity of illustration, only two paths are depicted in FIG. 4, while an actual seismic source wave would define many paths originating at the seismic source 402, reflected off the seafloor and subsurface structures, and reflected as ghost paths off the waters' surface.

Figure 5:
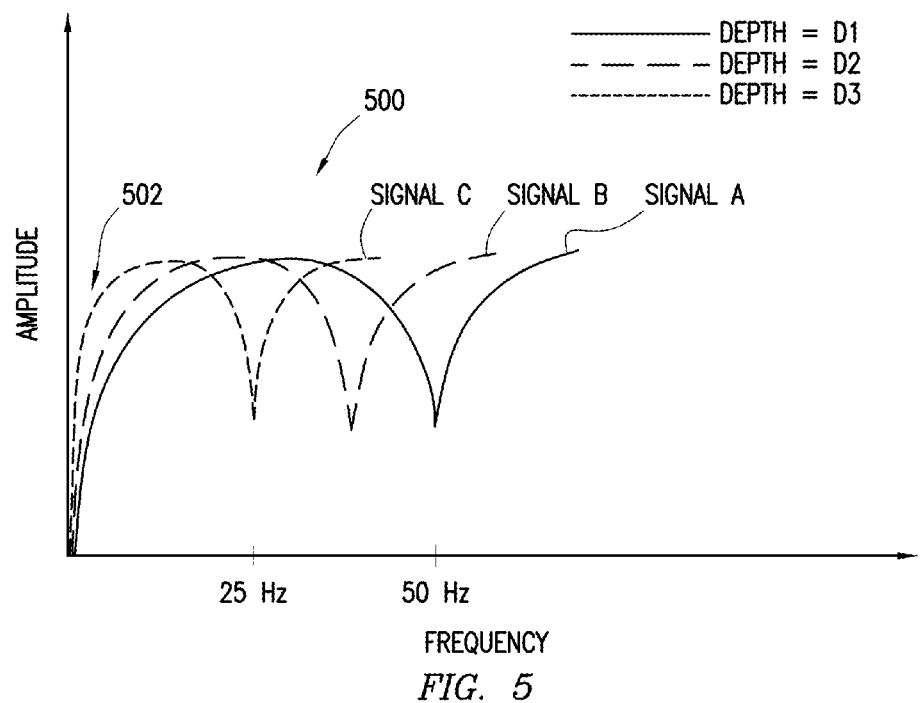
FIG. 5 shows an example plot of amplitude as a function of frequency recorded by hydrophones in accordance with at least some embodiments.

FIG. 5 shows an exemplary plot 500 of the amplitudes of signals recorded by hydrophones at different depths as a function of frequency. Signal A in FIG. 5 is a depiction of the amplitude of recorded frequencies for a hydrophone at a depth D1 of about 15 meters. As can be observed in the plot, a hydrophone at a depth of about 15 meters may record a signal having a spectral notch centered at about 50 Hz depending on various conditions. This spectral notch is generally a function of the surface ghosting, and the center frequency of the spectral notch tends to decrease with depth of the hydrophone. Signal B is a depiction of the amplitude of a signal recorded by a hydrophone at a depth D2 of about 20 meters. As can be observed in the plot, a hydrophone at a depth of about 20 meters may record a signal having a spectral notch centered at about 35 Hz depending on various conditions. Signal C is a depiction of the amplitude of a signal recorded by a hydrophone at a depth D3 of about 30 meters. As can be observed by the plot, a hydrophone at a depth of about 30 meters may record a signal having a spectral notch centered at about 25 Hz depending on various conditions. The signals depicted in FIG. 5 are given by way of example only, to illustrate the tendency of the spectral notch of a hydrophone to center about lower frequencies dependent on the depth of the hydrophone. Furthermore, the signals depicted in FIG. 5 illustrate the tendency toward improved low-frequency response (i.e., greater recorded amplitudes at lower frequencies) at deeper tow depths. For example the low frequency response in region 502 is greater for example Signal C than for example Signal A. In the frequency domain, actual data recorded by hydrophones may resemble more or less the exemplary plot 500 of FIG. 5.

Figure 6:
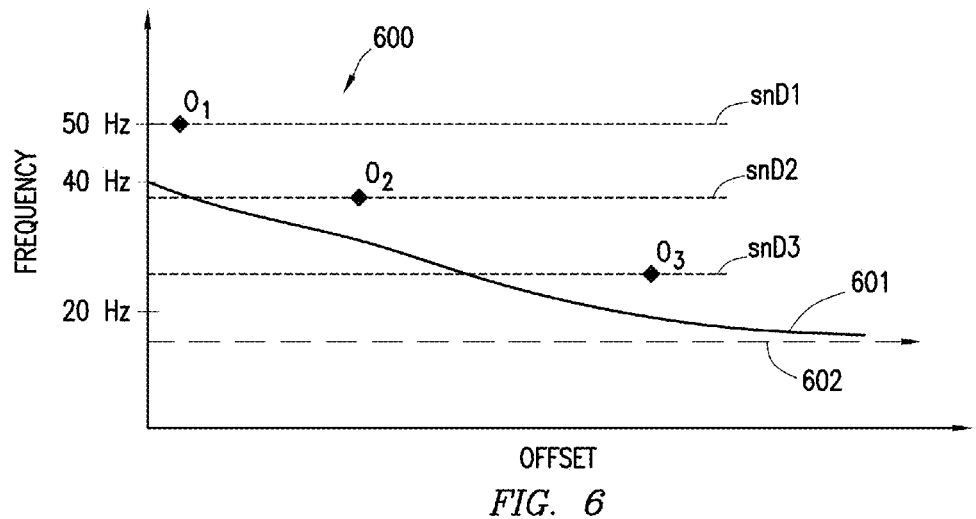
FIG. 6 shows an example plot of geophone noise floor as a function of offset in accordance with at least some embodiments.

FIG. 6 shows an example plot 600 of frequency of geophone noise floor as a function of offset. For purposes of illustration, the line 601 represents an example noise floor for signals recorded by geophones as a function of offset. Stated otherwise, line 601 represents a predetermined signal-to-noise threshold (in the frequency domain) below which a signal of interest is masked or obscured by noise. The area above line 601 represents a geophone spectrum where a signal of interest is not masked or obscured by noise. Reference lines snD1, snD2, and snD3 are also included on plot 600, and are reflective of the center frequencies of the spectral notches of a hydrophone at depths D1, D2, and D3 from FIG. 5. As can be seen from the positions of lines snD1, snD2, and snD3, offsets O1, O2, and O3 may be selected for hydrophones at depths D1, D2, and D3, respectively, such that the spectral notches of hydrophones at these depths correspond to frequencies for which geophone data is usable (e.g., above the predetermined signal-to-noise threshold shown by line 601). Thus, in some embodiments, target depths may be determined such that the spectral notch frequency for a particular hydrophone-geophone pair is above the noise floor for the depth and tension (or projected tension) for the hydrophone-geophone pair. Because tension decreases with increasing offset, the plot of FIG. 6 is also informative with regards to depths D1, D2, and D3 that may be selected for hydrophone-geophone pairs at offsets corresponding to a particular streamer tension such that the spectral notches of hydrophones at these depths correspond to frequencies above the geophone noise floor.

As plots of FIGS. 5 and 6 demonstrate, a tow-depth profile similar to that depicted in FIG. 3 may be designed such that tow depth for hydrophone-geophone pairs may be gradually increased as offset increases, where tension is reduced and therefore noise in the geophones is lower. The plots 500 and 600 also demonstrate the advantages of using hydrophone-geophone pairs in conducting geophysical surveys where data recorded by a geophone paired with, or co-located with a hydrophone may be used to supplement data lost due to the spectral notches of the hydrophones.

Referring again to FIG. 6, the plot illustrates the noise floor line 601 asymptotically approaching an absolute noise floor represented by line 602. The absolute noise floor is reflective of geophones experiencing at least some level of low frequency noise regardless of offset the geophone is from vessel 102 and how low the tension at the location of the geophone. Due to this low frequency noise, geophone data may become too noisy for use to augment hydrophone data for hydrophones at depths below a certain level. By way of example, a hydrophone towed at a depth of 40 meters may record data having a spectral notch centered at about 15-17 Hz depending on various conditions. If the spectral notch is below the absolute noise floor 602 for a particular type of geophone in a sensor streamer, geophone data may be too noisy to use to reliably augment data recorded by a hydrophone towed at this depth. For this reason, towed sensor streamers in accordance with example embodiments may be configured to include a first sloped depth profile, followed by a second section having an approximately constant depth profile where the constant depth does not cause the hydrophones' spectral notches to drop below the geophones' absolute noise floor. Such a depth profile enables supplementation of hydrophone data with paired geophone data along the entire length of the sensor streamer. This example is merely illustrative. The balancing of factors regarding noise from the hydrophone and geophones may result in different tow depths in different situations (e.g., different tension (arising from different towing speed or streamer configuration), different sources and degrees of tow noise excited by turbulence (e.g., devices attached to the streamer, or infestation by barnacles or algae), and/or different environmental factors (e.g., ice flows, swells or cross-currents)). In some embodiments a chosen depth profile may be a function determined by the noise and tension arising from the equipment configuration and expected environment. In other embodiments, the depth profile may additionally be adjusted, or adjustable, during the course of towing and data acquisition in response to changes in noise, tension or other factors, or in response to data recorded or measured by the streamer system. Nevertheless, at least a portion of the sensor streamer having higher tension may have a controlled or setpoint depth shallower than other portions of the sensor streamer having less tension.

In some embodiments, a progressive tow depth profile may be designed or used such that tow depth initially increases rapidly with offset near the tow vessel 102 and then increases more slowly with offset at offsets more distant from the tow vessel 102. From a side-elevation view, such embodiments of a depth profile may take on a curved appearance, or an exponential decrease in depth along the sensor streamer, and the transition of sensor streamer section 302 to the depth at which it couples with section 304 may be gradual. The specific geometry of a progressive depth-profiled section 302 would typically depend on the number of streamer positioning devices 310 used in the section 302, and the depth profile between any two streamer positioning devices may be more or less a straight line, and increasing the number of positioning devices could result in section 302 having an overall depth profile better approximating an exponential decreasing curve. In other embodiments irregular curves or varying curves may be used, and positioning devices 310 may be configured to position the streamer accordingly. Furthermore, in embodiments where the depth profile is dynamically adjustable (i.e., adjustable during towing and/or data acquisition), streamer positioning devices 310 may be dynamically adjustable, or programmable to change or adjust the depth profile during towing and data acquisition. In some embodiments dynamic changes to the depth profile may be based on local conditions or on data received or recorded during acquisition.

Example embodiments also include methods of designing depth profiles for sensor streamers. For example, a target depth for a first hydrophone-geophone pair at a first offset may be set based on the principles described with reference to the figures above. Target depths for subsequent hydrophone-geophone pairs may also be defined based on the same principles. As described above, the target depths may be set based on tension (or expected tension) in a streamer at the offset each hydrophone-geophone pair. The noise floor(s) (or expected noise floor(s)) of respective hydrophone-geophone pair(s) may also be taken into account in designing a particular depth profile. Based on the designed depth profile, streamer positioning devices may be configured to provide an operational depth profile closely approximating the designed profile.

Example embodiments may also include methods of conducting a geophysical survey by setting target depths for hydrophone-geophone pairs of a sensor streamer as described above, towing the streamer through the water, and obtaining data from the hydrophone-geophone pairs. In some embodiments, the depth profile of the sensor streamers may change over the course of the survey as the noise in the collected signals increases, for example, the sensor streamers become encrusted with barnacles. If the noise increases such that the noise floor of the geophone changes, different depth profiles (e.g., varying along the length, yet more shallow overall) may be used.

Example embodiments may further include methods of processing data recorded by multiple hydrophone-geophone pairs. In some embodiments, data recorded by the various hydrophones is replaced with, or augmented with data recorded by corresponding geophones. In some embodiments the data replaced or augmented corresponds to the spectral notches of the various hydrophones. Given that the depth profile may change along the sensor streamer, the frequency range of data replaced for each hydrophone-geophone pair may be different, and thus data selected for replacement may be based on the depth of respective hydrophone-geophone pair at the time the data was captured. In some embodiments geophone data may be combined with hydrophone data corresponding to other ranges of the hydrophone spectra depending on the particular application. Furthermore, various embodiments may include filtering steps. For example, geophone data may be filtered to remove low frequency noise prior to combination with or augmentation of hydrophone data.

Figure 7:
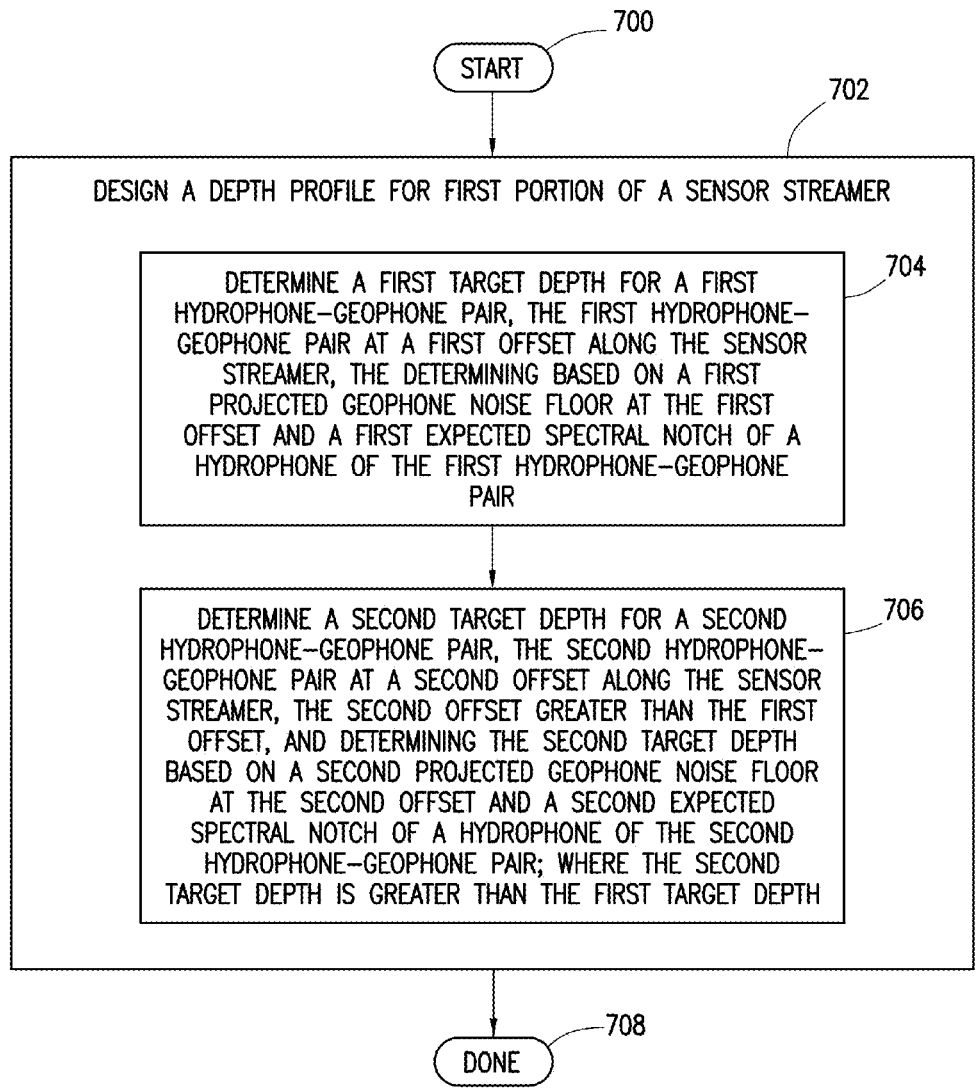
FIG. 7 shows a flow chart of a method in accordance with at least some embodiments.

FIG. 7 shows a method in accordance with example embodiments. In particular, the method starts (block 700) and comprises designing a depth profile for a first portion of a sensor streamer (block 702). The designing may comprise: determining a first target depth for a first hydrophone-geophone pair, the first hydrophone-geophone pair at a first offset along the sensor streamer, the determining based on a first projected geophone noise floor at the first offset and a first expected spectral notch of a hydrophone of the first hydrophone-geophone pair (block 704); determining a second target depth for a second hydrophone-geophone pair, the second hydrophone-geophone pair at a second offset along the sensor streamer, the second offset greater than the first offset, and determining the second target depth based on projected tension in the sensor streamer at the second offset and a second expected spectral notch of a hydrophone of the second hydrophone-geophone pair where the second target depth is greater than the first target depth (block 706). Thereafter the method ends (block 708).

Some embodiments comprise determining the first and second target depths based on projected tension at the locations of the hydrophone-geophone pairs. Target depths may then be set such that expected spectral notches are above the projected noise floors. In other embodiments target depths for some portions of a sensor streamer may be determined based on an absolute noise floor for a plurality of hydrophone geophone pairs in the respective portions of the sensor streamer. Further embodiments comprise configuring streamer positioning devices to position hydrophone-geophone pairs at about their target depths.

Figure 8:
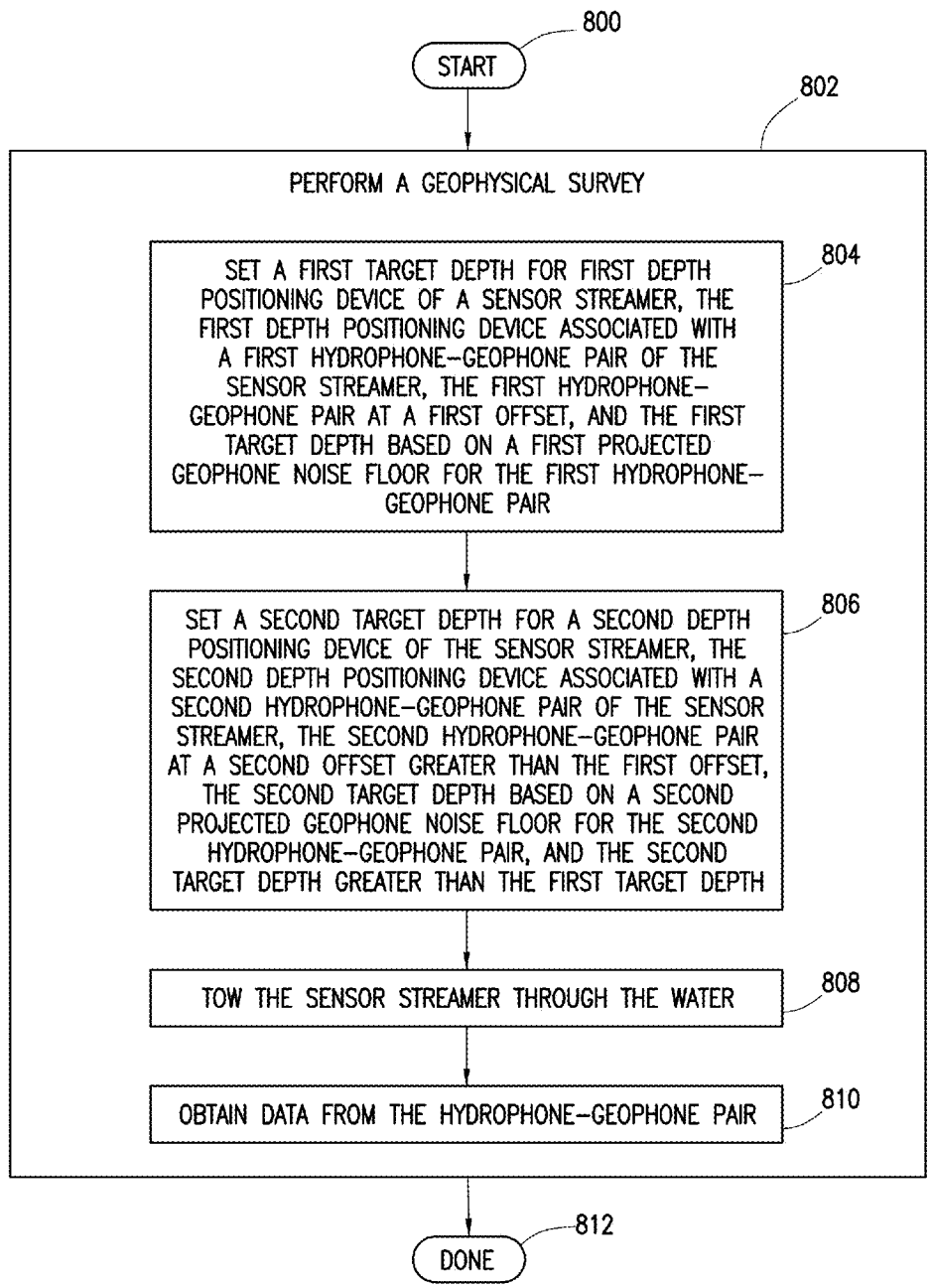
FIG. 8 shows a flow chart of a method in accordance with at least some embodiments.

FIG. 8 shows a method in accordance with further embodiments. In particular the method starts (block 800) and comprises performing a geophysical survey (block 802). The performing a geophysical survey may comprise: setting a first target depth for first depth positioning device of a sensor streamer, the first depth positioning device associated with a first hydrophone-geophone pair of the sensor streamer, the first hydrophone-geophone pair at a first offset, and the first target depth based on a first projected geophone noise floor for the first hydrophone-geophone pair (block 804); setting a second target depth for a second depth positioning device of the sensor streamer, the second depth positioning device associated with a second hydrophone-geophone pair of the sensor streamer, the second hydrophone-geophone pair at a second offset greater than the first offset, the second target depth based on second projected geophone noise floor for the second hydrophone-geophone pair, and the second target depth greater than the first target depth (block 806); towing the sensor streamer through the water (block 808); and obtaining data from the hydrophone-geophone pairs (block 810). Thereafter, the method ends (block 812).

Some embodiments comprise setting the first target depth based on tension in the sensor streamer proximate to the first hydrophone-geophone pair and a spectral notch of a hydrophone of the first hydrophone-geophone pair. Other embodiments comprise setting the first target depth such that the spectral notch for the hydrophone of the first hydrophone-geophone pair is above a noise floor of a geophone of the hydrophone-geophone pair. Further embodiments comprise setting the second target depth based on tension in the sensor streamer proximate the second hydrophone-geophone pair and a spectral notch of a hydrophone of the second hydrophone-geophone pair.

Some embodiments comprise setting the second target depth such that the spectral notch for the hydrophone of the second hydrophone-geophone pair is above a noise floor of a geophone of the hydrophone-geophone pair. Other embodiments comprise changing the first target depth based on the noise recorded by a geophone of the first hydrophone-geophone pair. Further embodiments comprise setting a third target depth for a plurality of depth positioning devices associated with hydrophone-geophone pairs of a portion of the sensor streamer having offsets greater than that of the first and second offsets.

Figure 9:
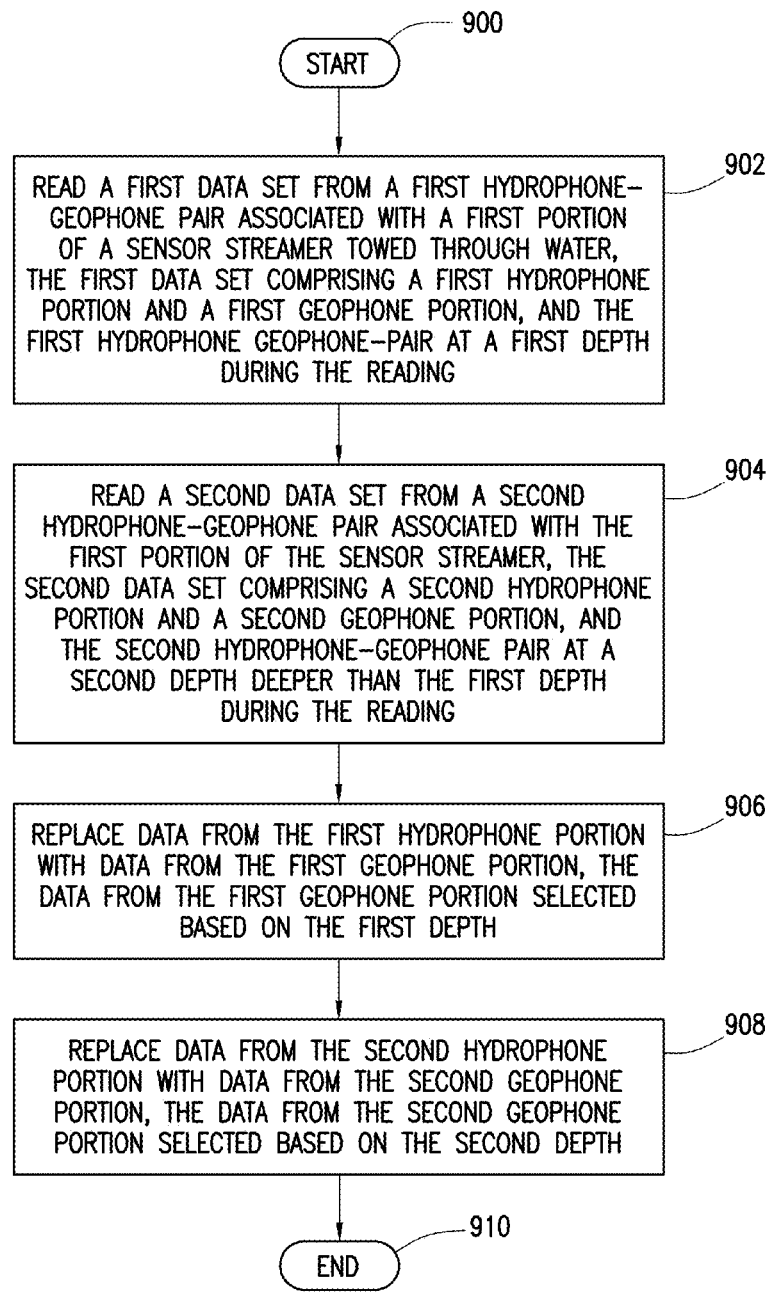
FIG. 9 shows a flow chart of a method in accordance with at least some embodiments.

Certain embodiments comprise combining data from the hydrophones and geophones to determine geophysical characteristics. In some embodiments data corresponding to the spectral notch of each hydrophone is replaced with data obtained from the geophone of each hydrophone-geophone pair FIG. 9 shows a method in accordance with further embodiments. In particular the method starts (block 900), and comprises: reading a first data set from a first hydrophone-geophone pair associated with a first portion of a sensor streamer towed through water, the first data set comprising a first hydrophone portion and a first geophone portion, and the first hydrophone geophone-pair at a first depth during the reading (block 902); reading a second data set from a second hydrophone-geophone pair associated with the first portion of the sensor streamer, the second data set comprising a second hydrophone portion and a second geophone portion, and the second hydrophone geophone-pair at a second depth deeper than the first depth during the reading (block 904); replacing data from the first hydrophone portion with data from the first geophone portion, the data from the first geophone portion selected based on the first depth (block 906); and replacing data from the second hydrophone portion with data from the second geophone portion, the data from the second geophone portion selected based on the second depth (block 908). Thereafter, the method ends (block 910).

In some embodiments, tow depth range can be further expanded. Larger offset could be towed at even deeper depths if the deghosting (i.e., taking into account wavefront reflections from the surface passing the sensor streamer as downward propagating waves) is restricted to hydrophone only recordings (i.e., wavefield separation based on dual sensors in the near to medium offset range and hydrophone-only deghosting for the larger offsets, either with a flat or slanted sensor streamer). The geometry of the ghost path (higher emergence angles at longer offsets increase the notch frequency) as well as the information extracted from long offset recordings (mainly deeper targets for which the recoverable bandwidth is restricted to the lowest frequencies due to attenuation of higher frequencies arising from propagation through an inelastic earth) may support this case.

Controlling depth of the sensor streamer as a function of offset or tension may be implemented by the streamer positioning devices 150, 152, and/or 310. In sections having a linear correlation of depth to offset, each streamer positioning device will be assigned a different setpoint or target depth. Given that the streamer positioning devices control depth to +−0.5 meters, sufficient depth control over the length of the sensor streamer is achievable.

Towing a sensor streamer with tow depth controlled by offset or tension may result in improved signal-to-noise ratio (as compared to constant two depth across the entire sensor streamer). Front end drag may be reduced in some cases. Moreover, given the improved signal-to-noise ratio, towing speed may be increased.

In some embodiments, processing of hydrophone and geophone data may be done aboard vessel 102 by a computer system coupled to recording system 104. In other embodiments, recorded data may be processed by a computer not located aboard the vessel 102 (e.g., the data may be processed by a computer configured to read data obtained from multiple hydrophone-geophone pairs).

In accordance with an embodiment, a geophysical data product indicative of certain properties of the subsurface rock may be produced from the hydrophone and geophone data. The geophysical data product may include processed seismic geophysical data and may be stored on a non-transitory, tangible computer-readable medium. The geophysical data product may be produced offshore (e.g., by equipment on vessel 102) or onshore (e.g., at a facility on land) either within the United States or in another country. If the geophysical data product is produced offshore or in another country, it may be imported onshore to a facility in the United States. Once onshore in the United States, geophysical analysis may be performed on the data product.

Figure 10:
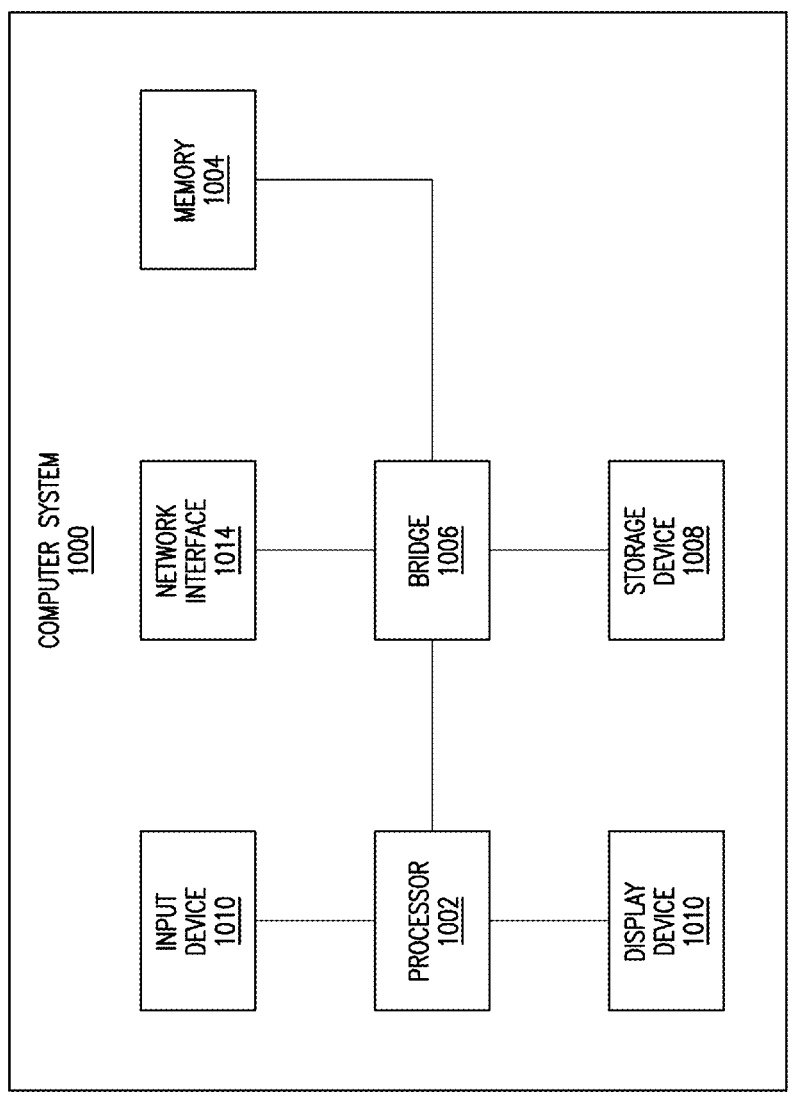
FIG. 10 shows a computer system that may be used in accordance with at least some embodiments.

FIG. 10 shows a computer system 1000, which is illustrative of a computer system upon which the various embodiments may be practiced. In particular, computer system 1000 comprises a processor 1002, and the processor couples to a main memory 1004 by way of a bridge device 1006. Moreover, the processor 1002 may couple to a long term storage device 1008 (e.g., a hard drive, solid state disk, memory stick, optical disc) by way of the bridge device 1006. Programs executable by the processor 1002 may be stored on the storage device 1008, and accessed when needed by the processor 1002. The program stored on the storage device 1008 may comprise programs to implement the various embodiments of the present specification. In some cases, the programs are copied from the storage device 1008 to the main memory 1004, and the programs are executed from the main memory 1004. Thus, the main memory 1004, and storage device 1004 shall be considered computer-readable storage mediums. In addition, a display device 1012, which may comprise any suitable electronic display device upon which any image or text can be displayed, may be coupled to the processor 1002 by way of bridge 1006. An input device or input devices, 1010 may also be coupled to the processor by way of the bridge 1006.

Furthermore, computer system 1000 may comprise a network interface 1014, coupled to the processor 1002 by way of bridge 1006, and coupled to storage device 1004, the network interface 1014 acting to couple the computer system to a communication network.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

It is noted that while theoretically possible to perform some or all the calculations and analysis by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    designing a depth profile for first portion of a sensor streamer by
        determining a first target depth for a first hydrophone-geophone pair, the first hydrophone-geophone pair at a first offset along the sensor streamer, the determining based on a first projected geophone noise floor at the first offset and a first expected spectral notch of a hydrophone of the first hydrophone-geophone pair; and
        determining a second target depth for a second hydrophone-geophone pair, the second hydrophone-geophone pair at a second offset along the sensor streamer, the second offset greater than the first offset, and determining the second target depth based on a second projected geophone noise floor at the second offset and a second expected spectral notch of a hydrophone of the second hydrophone-geophone pair;
    wherein the second target depth is greater than the first target depth.

2. The method of claim 1 wherein the first and second projected geophone noise floors are determined based on the projected tension of the sensor streamer at the first and second offsets.

3. The method of claim 1 further comprising towing the sensor streamer in water with the designed depth profile.

4. The method of claim 1 wherein determining the first target depth further comprises setting the first target depth such that the first expected spectral notch is above the first projected geophone noise floor.

5. The method of claim 4 wherein determining the second target depth further comprises setting the second target depth such that the second expected spectral notch is above the second projected geophone noise floor.

6. The method of claim 1 further comprising determining a third target depth applicable to a plurality of hydrophone-geophone pairs of a second portion of the sensor streamer, the third target depth deeper than the first and second target depths, and the second portion of the sensor streamer distinct from the first portion.

7. The method of claim 6 wherein determining the third target depth further comprises selecting the third target depth based on absolute noise floor of the plurality of hydrophone-geophone pairs.

8. The method of claim 1 further comprising configuring a plurality of streamer positioning devices to position the hydrophone-geophone pairs at about their respective target depths.

9. The method of claim 1 wherein the target depths for the hydrophone-geophone pairs are between about 20 meters and about 30 meters.

10. A computer system comprising:
    a processor;
    a memory coupled to the processor;
    the memory storing a program that, when executed by a processor, causes the processor to:
        design a depth profile for a first portion of a sensor streamer to be used in a marine survey by causing the processor to
            determine a first target depth for a first hydrophone-geophone pair, the first hydrophone-geophone pair at a first offset along the sensor streamer, the determination based on a first projected geophone noise floor at the first offset and a first expected spectral notch of a hydrophone of the first hydrophone-geophone pair; and
            determine a second target depth for a second hydrophone-geophone pair, the second hydrophone-geophone pair at a second offset along the sensor streamer, the second offset greater than the first offset, and the determination of the second target depth based on a second projected geophone noise floor at the second offset and a second expected spectral notch of a hydrophone of the second hydrophone-geophone pair;

wherein the second target depth is greater than the first target depth.

11. The computer system of claim 10 wherein the program causes the processor to determine the first and second projected geophone noise floors based on the projected tension of the sensor streamer at the first and second offsets.

12. The computer system of claim 10 wherein when the processor determines the first target depth, the program further causes the processor to set the first target depth such that the first expected spectral notch is above the first projected geophone noise floor.

13. The computer system of claim 12 wherein the processor determines the second target depth, the processor further causes the processor to set the second target depth such that the second expected spectral notch is above the second projected geophone noise floor.

14. The computer system of claim 10 wherein the program further causes the processor to determine a third target depth applicable to a plurality of hydrophone-geophone pairs of a second portion of the sensor streamer, the third target depth deeper than the first and second target depths, and the second portion of the sensor streamer distinct from the first portion.

15. The computer system of claim 14 wherein when the processor determines the third target depth, the program further causes the processor to select the third target depth based on absolute noise floor of the plurality of hydrophone-geophone pairs.

16. The computer system of claim 10 wherein the program further causes the processor to configure a plurality of streamer positioning devices to position the hydrophone-geophone pairs at about their respective target depths according to the designed depth profile.

17. The computer system of claim 10 wherein the target depths for the hydrophone-geophone pairs are between about 20 meters and about 30 meters.

18. A non-transitory computer-readable medium storing a program that, when executed by a processor, causes the processor to:

design a depth profile for a first portion of a sensor streamer to be used in a marine survey by causing the processor to determine a first target depth for a first hydrophone-geophone pair, the first hydrophone-geophone pair at a first offset along the sensor streamer, the determination based on a first projected geophone noise floor at the first offset and a first expected spectral notch of a hydrophone of the first hydrophone-geophone pair; and determine a second target depth for a second hydrophone-geophone pair, the second hydrophone-geophone pair at a second offset along the sensor streamer, the second offset greater than the first offset, and the determination of the second target depth based on a second projected geophone noise floor at the second offset and a second expected spectral notch of a hydrophone of the second hydrophone-geophone pair;

wherein the second target depth is greater than the first target depth.

19. The computer system of claim 18 wherein the program causes the processor to determine the first and second projected geophone noise floors based on the projected tension of the sensor streamer at the first and second offsets.

20. The non-transitory computer-readable medium of claim 18 wherein when the processor determines the first target depth, the program further causes the processor to set the first target depth such that the first expected spectral notch is above the first projected geophone noise floor.

21. The non-transitory computer-readable medium of claim 20 wherein the processor determines the second target depth, the processor further causes the processor to set the second target depth such that the second expected spectral notch is above the second projected noise floor.

22. The non-transitory computer-readable medium of claim 18 wherein the program further causes the processor to determine a third target depth applicable to a plurality of hydrophone-geophone pairs of a second portion of the sensor streamer, the third target depth deeper than the first and second target depths, and the second portion of the sensor streamer distinct from the first portion.

23. The non-transitory computer-readable medium of claim 22 wherein when the processor determines the third target depth, the program further causes the processor to select the third target depth based on absolute noise floor of the plurality of hydrophone-geophone pairs.

24. The non-transitory computer-readable medium of claim 18 wherein the program further causes the processor to configure a plurality of streamer positioning devices to position the hydrophone-geophone pairs at about their respective target depths according to the designed depth profile.

25. The non-transitory computer-readable medium of claim 18 wherein the target depths for the hydrophone-geophone pairs are between about 20 meters and about 30 meters.

* * * * *